United States Patent
Warner

[15] 3,670,110
[45] June 13, 1972

[54] TELEPHONE LINE TRANSFER CIRCUIT USING DISJOINT ROUTING NETWORK FOR PARTIAL DECODING

[72] Inventor: Wesley John Warner, Mississauga, Ontario, Canada

[73] Assignee: Northern Electric Company Limited, Montreal, Quebec, Canada

[22] Filed: Feb. 22, 1971

[21] Appl. No.: 117,550

[52] U.S. Cl. ............................179/18 AD, 179/111, 179/37
[51] Int. Cl. ..........................................................H04m 3/38
[58] Field of Search ..........................179/1 H, 18 AD, 99, 37

[56] References Cited

UNITED STATES PATENTS 2,883,457 4/1959 Carter et al. ........................179/1 CN
3,014,097 12/1961 Apt ..................................179/18 AD
3,342,944 9/1967 Barbato et al. ....................179/18 AD

*Primary Examiner*—Kathleen H. Claffy
*Assistant Examiner*—Thomas L. Kundert
*Attorney*—John E. Mowle

[57] ABSTRACT

An intercom telephone system having a relay counter which includes a disjoint routing contact network. For single digit codes, the routing network decodes ringing applied to a first input thereof onto one of 10 outputs depending on the digit dialed. For two digit codes, a transfer circuit connected to one of the 10 outputs is activated by a transfer signal applied to the first input after the first digit, to switch the ringing source to a second input of the routing network. After the second digit is dialled, ringing applied to the second input is partially decoded by the routing network onto one of four of the outputs. The remaining decoding onto one of 10 further outputs for two digit stations is effected by two relays in the transfer circuit slaved to two corresponding relays in the relay counter. Thus, a portion of the routing network is reused on the second digit of two digit calls for partial decoding.

11 Claims, 5 Drawing Figures

INVENTOR.
WESLEY JOHN WARNER
BY Rogers, Bereskin & Parr

INVENTOR.
WESLEY JOHN WARNER
BY Rogers, Bereskin & Parr

INVENTOR.
WESLEY JOHN WARNER

BY Rogers, Bereskin & Parr

INVENTOR.
WESLEY JOHN WARNER
BY Rogers, Bereskin & Parr

TELEPHONE LINE TRANSFER CIRCUIT USING DISJOINT ROUTING NETWORK FOR PARTIAL DECODING

This invention relates to a transfer circuit for a telephone system, particularly an intercom system.

In conventional intercom telephone systems, there is a source of ringing voltage, and a switching unit to direct the ringing voltage to the particular station dialled. If there are 10 stations or less, the switching unit has 10 (or fewer) output leads, one for each station. The telephone number for each station is a single digit, and each digit causes the switching train to connect the ringing voltage to a different lead.

When the number of stations exceeds 10, then some of the telephone numbers must be two digit codes. Two digit codes are usually handled by connecting a transfer circuit to one of the output leads of the switching unit. The digit associated with that lead becomes the first digit of up to 10 two digit codes. The transfer circuit usually includes means responsive to receipt of a signal on the output lead associated with the first digit of two digit codes to cause connection of the ringing voltage source to a second switching unit associated with 10 further stations. Thus, when the second digit of a two digit code is dialled, ringing is applied through the further switching unit to one of the additional group of up to 10 stations.

Transfer circuits are well known, but prior art transfer circuits generally require a relatively large number of leads. Since many intercom telephone systems are of long established design and employ plug-in cards having a limited number of output pins, difficulty has been experienced in adapting transfer circuits to such cards, and some designers have found it necessary to place transfer circuits on double size plug in cards. Since the capacity for plug in cards is limited, this limits the flexibility of expansion of the system and the addition of other features to the system.

Transfer circuits have been provided employing a rotary switch having two levels of contacts, with the transfer being achieved at the wipers of the contact levels. This approach has the disadvantage that it uses a component (a rotary switch) which is foreign to the hardware usually used in intercom systems, namely miniature relays and semiconductors, and in addition, incorporating two levels of contacts as part of the selector is wasteful since in the bulk of dial intercom application, only 10 codes or fewer are required and transfer operation is unnecessary.

Accordingly, it is an object of the invention to provide a transfer circuit which requires a limited number of leads and which is efficient in its use of components. In a preferred embodiment of the invention, this is achieved by employing a routing contact network of a relay counter to route a ringing voltage to a selected subscriber station, with use being made of the disjoint property of the routing contact network by reusing a segment of the routing contact network for partial decoding of the second digit of two digit codes. In a preferred embodiment of the invention, the remainder of the decoding is accomplished by two additional relays slaved to corresponding relays of the relay counter.

Further objects and advantages of the invention will appear from the following description, taken together with the accompanying drawings, in which.

Figure 1:
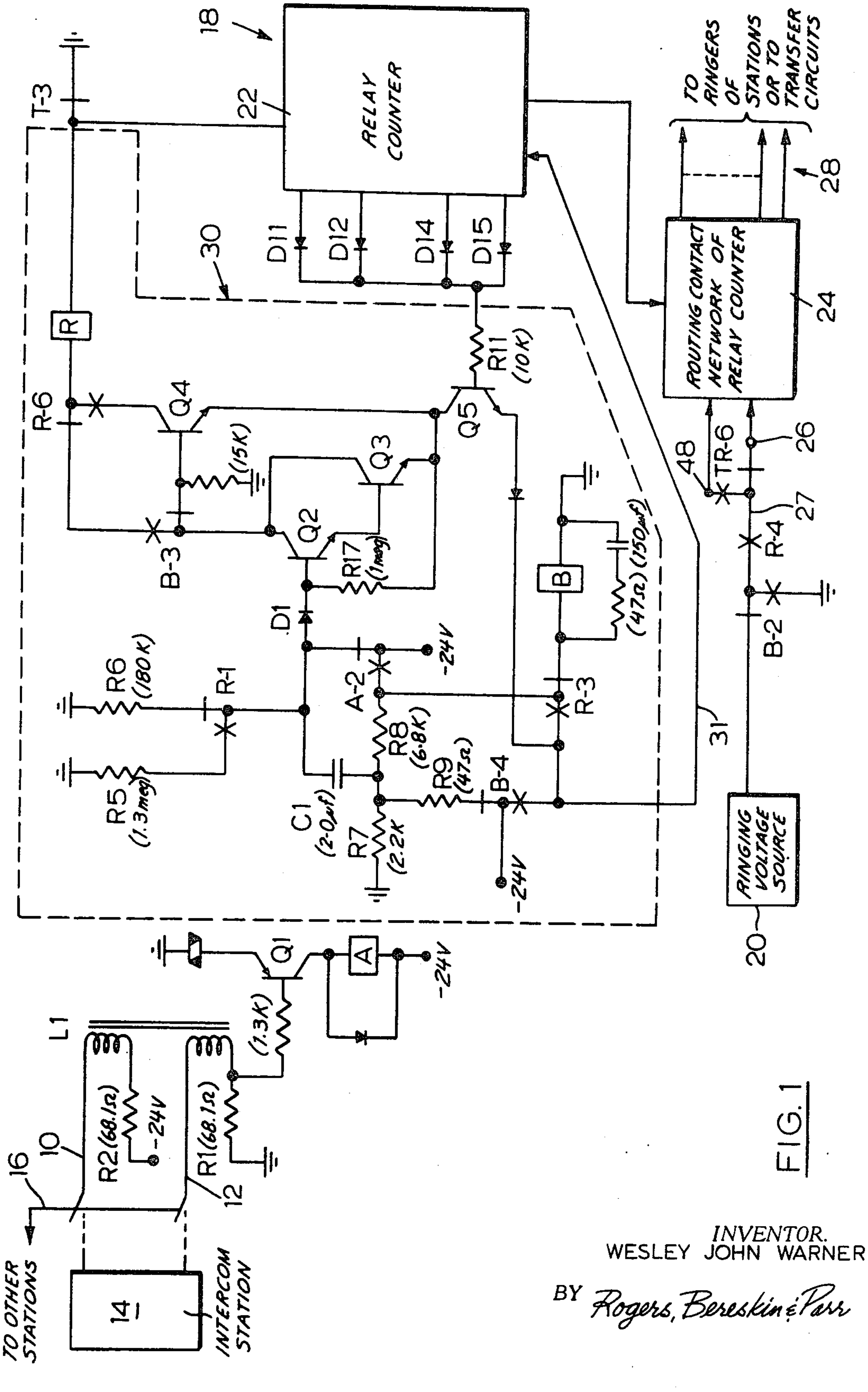
FIG. 1 is a circuit diagram showing a telephone intercom switching system with which a transfer circuit of the invention may be used.

In the drawings, illustrative values are shown in parentheses beside the components. Detached contact notation is also used, in which an "x" indicates a relay contact which is open when the relay is de-energized, and a "-" indicates a relay contact which is closed when the relay is de-energized.

Reference is first made to FIG. 1 which shows a typical telephone intercom switching system. The system of FIG. 1 includes tip and ring leads 10, 12 shown connected to an intercom station 14 and also connected to the remaining intercom stations as indicated diagrammatically by branch leads 16. Leads 10, 12 are connected through an inductor L1 to −24 volts and ground respectively to provide talking battery to the stations. Lead 12 is also connected to transistor Q1 having a pulsing relay A in its collector circuit, so that transistor Q1 and hence relay A will operate when a station in the system goes off hook. When a calling party dials a digit, relay A releases during each dial pulse and reoperates at the end of each dial pulse.

Relay A serves to control a conventional relay counter 18, which reacts to the pulsing of relay A to connect a ringing voltage source 20 to the ringer of the station that has been called.

Figure 2:
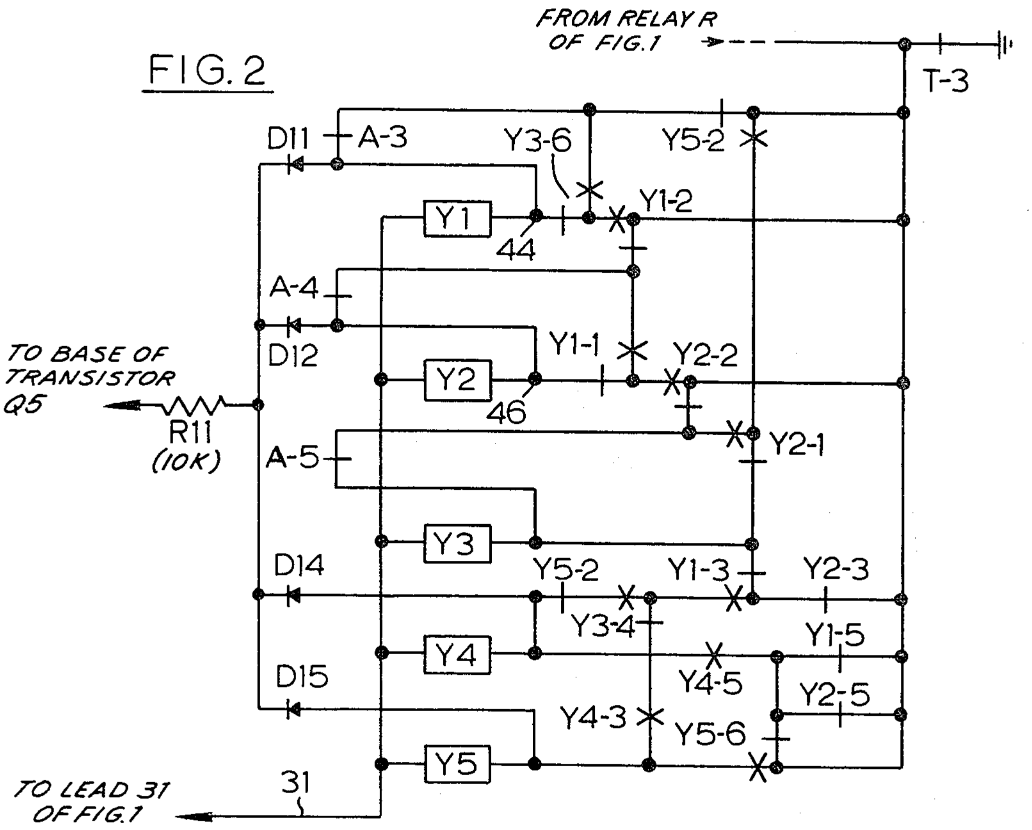
FIG. 2 is a circuit diagram showing the connections of the coils of a relay counter indicated in block form in FIG. 1.

More specifically, the relay counter 18 includes a conventional coil network 22 containing (see FIG. 2) five counting relays, Y1, Y2, Y3, Y4, Y5 connected as shown and controlled by contacts A-3, A-4, A-5 of relay A. As relay A releases and reoperates during dialling, relays Y1 to Y5 when supplied with battery step through the operating combinations shown in Table I at the end of this description. In Table I, the dashes between digits indicate the intervals between dial pulses during which relay A is operated. This is entirely conventional.

Relays Y1 to Y5 (also called the Y relays) include a conventional routing contact network 24 (FIG. 3) having an input terminal 26 and 10 output terminals 28 numbered from "1" to "0" inclusive. As relay A releases and reoperates to step the Y relays through their operating combinations, the routing network 24 connects input terminal 26 to respective different output terminals corresponding to the number of dial pulses received. For example, after the first dial pulse, when relay A reoperates, relay Y2 is operated and input 26 is connected through contacts Y2-6 operated, Y5-5 and Y4-4 released, to output terminal "1". This arrangement also is entirely conventional.

The input terminal 26 of the routing network 24 is coupled to the ringing source 20 by a ringing lead 27, while the outputs 28 are connected to the ringers of the respective stations having single digit telephone numbers or to transfer circuits. If there are fewer than 10 stations, some outputs 28 will be unused.

Timing and control of the ringing functions are provided by a timing and control circuit 30. Circuit 30 includes a ringing relay R, a slow release relay B, and relay capacitor C1. Capacitor C1 is connected through contacts R-1 of relay R to timing resistors R5, R6 and is also connected through diode D1 to the base of transistor Q2. Transistor Q2 is connected with transistor Q3 as a high gain Darlington pair. Transistors Q2, Q3 are controlled in part by transistor Q5, the base of which is connected through resistor R11 to an OR gate consisting of diodes D11, D12, D14, D15. Diodes D11, D12, D14, D15 are connected respectively to the coils of relays Y1, Y2, Y4 and Y5. Transistors Q2, Q3 and Q5 together control transistor Q4, which in turn controls the release of relay R, as will be explained.

The operation of the system of FIG. 1 is fully explained in my copending patent application Ser. No. 117,549 filed concurrently herewith, and accordingly such operation will be explained more briefly here. Reference may be made to my above mentioned copending application for a more detailed explanation.

The system of FIG. 1 operates as follows. When a calling party lifts his handset, connecting leads 10, 12 together, transistor Q1 and relay A operate. Contacts A-2 in operating operate relay B. Contacts B-4 apply −24 volts through lead 31 to the relay counter coil network 22, thus energizing the coil network for pulsing.

Relay Y3 operates at this time via contacts Y1-3 and Y2-3 released to ground, but the remainder of the Y relays are off (see Table I) so the base of transistor Q5 is open circuited. Transistors Q2, Q3, Q4, and Q5 are thus off.

When the party at calling station 14 dials, relay A releases during each dial pulse and reoperates at the end of each dial pulse. Relay B remains operated during pulsing since it is slow release. As relay A pulses, contacts A-3, A-4 and A-5 release and reoperate to operate successive different combinations of relays in the relay counter, thus connecting input 26 of the routing network 24 to successive different output terminals 28 as dial pulses are received.

At the first dial pulse break, relay Y2 in the relay counter operates via contacts A-4 and Y1-2 released to ground. The ground at the right hand side of the coil of relay Y2 is extended through resistor R12 to the base of transistor Q5, enabling transistor Q5. Throughout the remainder of dialling and thereafter, ground will be applied to the base of transistor Q5 since one of relays Y1, Y2, Y4 and Y5 will always be operated during this time (see Table I). Transistors Q2, Q3 will thus turn on as soon as they are forward biased, i.e. as soon as the voltage at the base of transistor Q2 rises above −24 volts.

However, during the first and each succeeding dial pulse, transistors Q2, Q3 are prevented from operating by −24 volts applied to the top plate (as drawn) of capacitor C1 by contacts A-2 released. The negative voltage applied to the top plate of capacitor C1 during dial pulses reduces the voltage at the bottom plate of capacitor C1, but the bottom plate charges rapidly to ground through resistor R7.

At the end of each dial pulse, contacts A-2 reoperate, reducing the voltage at the bottom plate of capacitor C1 to about −6 volts (through the resistor R7, R8 voltage divider) and hence shifting the voltage at the top plate of capacitor C1 down to about −30 volts. The voltage at the top plate of capacitor C1 then rises toward ground as capacitor C1 charges through resistor R6. The time constant involved is sufficiently long that before the voltage at the top plate of capacitor C1 rises sufficiently to turn on transistor Q2, the next dial pulse occurs to clamp the voltage at the top plate of capacitor C1 to −24 volts again.

At the end of dialling, the top plate of capacitor C1 charges toward ground without interference from contacts A-2. When the voltage at the top plate of capacitor C1 rises about −24 volts, transistors Q2, Q3, Q5 begin to turn on and are turned on fully after a delay of about 79 milliseconds after the end of dialling. Transistors Q2, Q3, Q5 operate ringing relay R, which locks operated through contacts R-6 operated and through transistor Q4, which also now operates.

A ground signal is now conducted through contacts B-2 and R-4 operated to lead 27. This serves to operate a transfer circuit if such transfer circuit is connected to the output lead 28 just signalled. Otherwise the ground signal has no effect.

In addition, when relay R operates, its contacts R-3 release relay B. Relay B, being slow release, releases shortly after relay R operates, allowing a short time interval for application of the ground signal to lead 27. When relay B releases, contacts B-2 release to apply ringing from source 20 to lead 27 in place of the ground signal. The path from −24 volts to lead 31 through contacts B-4 is broken, but a new path is established through contacts A-2 and R-3 operated, to keep the relay counter energized.

The duration of the ring is timed by capacitor C1. When relay B releases, contacts B-4 reduce the voltage at the bottom plate of capacitor C1, from −6 to −24 volts. This negative step drives the voltage at the top plate of capacitor C1 down to about −39 volts, turning off transistors Q2, Q3. Transistors Q4, Q5 remain operated due to contacts R-6 operated. Capacitor C1 now charges through resistor R5 (switched into the charging circuit by contacts R-1 in place of resistor R6). After about 1.5 seconds, the voltage at the top plate of capacitor C1 rises above −24 volts to turn on transistors Q2, Q3 again. When transistors Q2, Q3 reoperate, they rob transistor Q4 of its base current, turning off transistor Q4 and hence releasing relay R.

When relay R releases, its contacts R-3 remove −24 volts from lead 31, releasing the operated Y relays in the relay counter. Contacts R-3 also reoperate relay B, and contacts B-4 reapply −24 volts to lead 31, operating relay Y3 in the relay counter as before and preparing the relay counter for redialling.

When no transfer circuit is needed, all 10 output terminals 28 of the routing network 24 may be connected to intercom stations. However, for transfer circuit operation, the output terminals 28 are divided into a first group 32 (FIG. 3) consisting of the terminals numbered "1", "4", "7" and "0", and a second group 34 consisting of the remaining output terminals 28. One of the output terminals of group 34, for example that marked "3" is connected via lead 36 to a transfer circuit 38.

The transfer circuit 38 includes a relay T connected through a normally closed contact of contacts T-1 to lead 36. The transfer circuit also includes a relay TR operated by relay T, and relays TY1, TY2 which are slaved to relays Y1, Y2 in the relay tree by leads 40, 42 connected to terminals 44, 46 (FIGS. 2 and 3) respectively in the relay counter coil network 22.

In addition, for transfer operation, the routing network 24 includes a second input terminal 48 connected (see FIG. 3) between contacts Y5-5 and Y2-6. Input 48 is coupled to ringing lead 27 through contacts TR-6 of relay TR. Contacts TR-6, when operated, connect input 48 to the ringing lead 27 in place of input 26. As will be explained, a ringing signal applied to input 48 will be directed to one of the group 32 terminals no matter what digit has been dialled. The group 32 terminals are connected through contacts TR-2, TR-3, TR-4, TR-5 of relay TR to a further routing contact network 50 consisting of contacts of relays TY1, TY2. Routing network 50 has 10 output terminals 52 numbered from X1 to X0 and connected to the respective ringers of stations having two digit telephone numbers. The group 32 terminals are also connected through contacts TR-2 to TR-4 respectively and via leads 54 to further transfer circuits, if further transfer circuits are needed (and also may be connected to the ringers of stations having single digit codes, as will be explained).

The transfer circuit 38 is best understood by a description of its operation, which is as follows. If a calling station dials a "3" , then at the end of dialling, a ground signal is applied as previously described through input 26 of the relay counter, and through routing contact network 24 to the output terminal 28 numbered "3". This ground signal is then extended over lead 36 to operate relay T. (The other side of relay T is supplied with −24 volts via leads 31 and 56.)

When relay T operates, it locks itself operated to ground through contacts T-1. Contact T-2 then operates relay TR and also prepares an operating path for relays TY1, TY2. Contact T-3 (FIGS. 1, 2) opens the ground to the operated relays of the relay counter, releasing the operated Y relays, and also releases relay R before relay B can release, thus preventing application of a ringing voltage to the routing network 24.

When relay TR operates, it locks operated through contacts TR-1 to lead 56. Contacts TR-1 release relay T and in addition continue to maintain the prepared operating path for relays TY1 and TY2. Contacts TR-2, TR-3, TR-4 and TR-5 operate to disconnect any other transfer circuits from the group 1 output terminals 32.

In addition, when relay TR operates, its contacts TR-6 disconnect the ringing lead 27 from input 26 of the routing contact network 24 and instead connect the ringing lead 27 to input 48 of network 24. When relay T releases, contact T-3 closes to enable the relay counter coil network 22 again. Relay Y3 in the relay counter reoperates, and the circuit is now ready for dialling of the second digit of a two digit telephone number.

Figure 3:
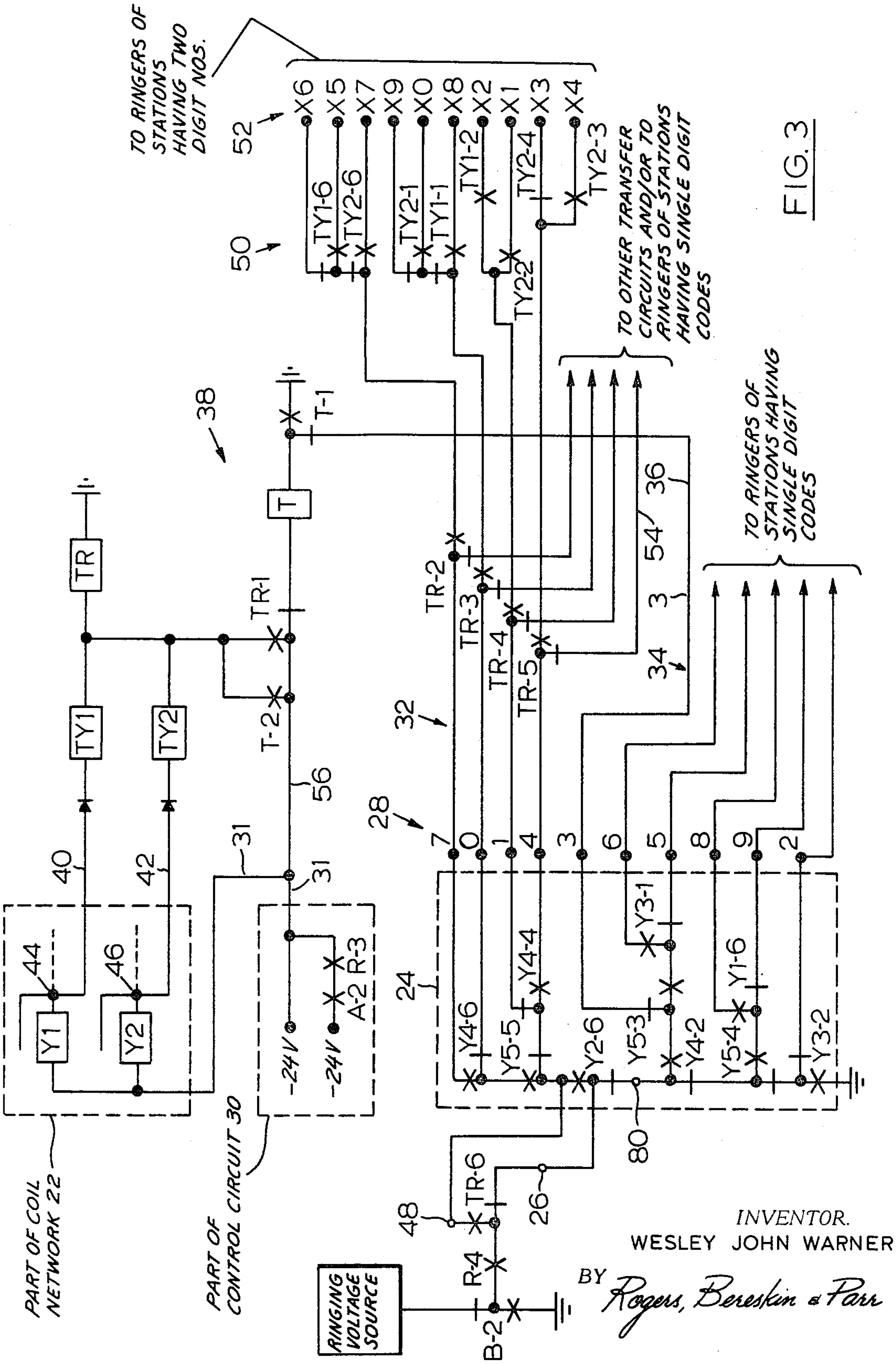
FIG. 3 is a circuit diagram showing a transfer circuit according to the invention.

When the caller dials a second digit, at the end of dialling, relay R operates as previously described and a brief burst of ground signal is applied via input 48 of the routing network 24 to one of the group 32 output terminals (FIG. 3). It will be seen that no signal from input 48 can reach any of the group 34 terminals because of contacts Y2-6. Since relay TR is operated, operating contacts TR-2 to TR-5 inclusive, the ground signal is also disconnected from leads 54, and therefore has no effect.

After a brief interval following operation of relay R, relay B releases as described and ringing is applied for a timed interval to input 48 and through a portion of the routing contact network 24 to one of the group 32 output terminals. In particular, if digit 1 or 2 is dialled, it will be seen from inspection of Table I and FIG. 4 that neither of relays Y4, Y5 will operate and the ringing signal will be applied to the group 32 terminal numbered "1". If digit 3 or 4 is dialled, relay Y4 operates and the ringing signal will be applied to the group 32 output terminal numbered "4". If digit 5, 6 or 7 is dialled, relays Y4 and Y5 both operate and the ringing signal will be applied to the group 32 output terminal numbered "7". If digit 8, 9 or 0 is dialled, relay Y5 operates and the ringing signal is applied to the group 32 terminal numbered "0".

From the group 32 terminals, the ringing signal is further decoded by routing network 50 onto one of the output terminals 52 corresponding to the digit dialled. For example, if digit 2 has been dialled, then relays Y1 and TY1 will be operated and the remaining Y relays will all be released. Input 48 will be connected through contacts Y5-5 and Y4-4 released to the group 32 terminal numbered 37 1" and then through contacts TY1-2 operated to terminal X2 to be connected to the ringer of the station whose telephone number is 22. If there are fewer than 10 stations having two digit telephone numbers, then some of the output terminals 52 will not be used.

At the end of ringing, relay R releases as previously described removing battery from lead 31, and hence releasing any operated relays in the relay counter, together with relays TY1 and TY2 if operated, and relay TR. This restores the transfer circuit to its normal released condition. The complete two digit code may then be redialled to resignal the same station.

Up to 10 transfer circuits may be connected in the manner shown for transfer circuit 38, but normally a maximum of three transfer circuits will be used because of the traffic limitations of a single talking path. This provides a maximum of 37 codes (i.e. 40 codes minus the three required to activate the three transfer circuits).

Figure 4:
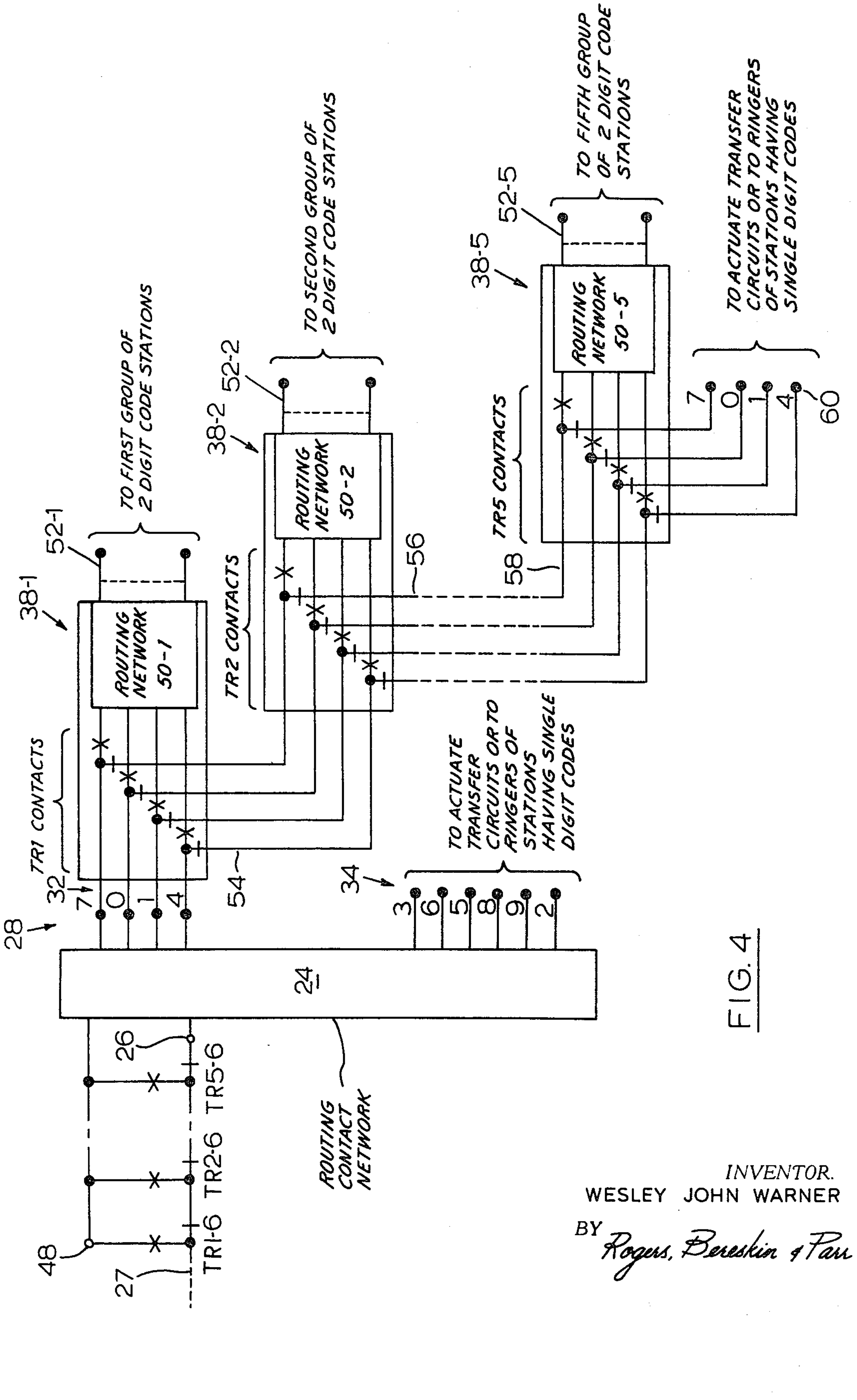
FIG. 4 is a block diagram showing how a number of transfer circuits can be connected according to the invention.

The manner in which additional transfer circuits may be connected is shown in FIG. 4. For illustrative purposes FIG. 4 shows five transfer circuits 38-1 to 38-5, although as indicated, no more than three would be used under normal circumstances. Each transfer circuit is the same as transfer circuit 38 of FIG. 3 and thus includes its own T relay (not shown), its own transfer relay TR1 to TR5 respectively (not shown) corresponding to relay TR of transfer circuit 38, and its own routing network 50-1 to 50-5(having outputs 52-1 to 52-5 respectively)corresponding to routing network 50 of transfer circuit 38.

The routing network 50-1 of transfer circuit 38-1 is connected to the group 32 leads through normally open relay TR1 contacts (indicated as the TR1- contacts in FIG. 4). The group 32 outputs are connected through normally closed contacts of the TR1- contacts and through leads 54 to the second transfer circuit 38-2. In transfer circuit 38-2, leads 54 are connected through normally open relay TR2- contacts to routing network 50-2 and are also connected through normally closed relay TR2- contacts and through leads 56 to the third transfer circuit (not shown). This process continues with the group 32 outputs ultimately being connected to leads 58 which are directed to the last (here the fifth) transfer circuit 38-5. There the leads 58 are connected through normally open relay TR5- contacts to routing network 50-5 and are connected through normally closed relay TR5- contacts to terminals 60.

The transfer circuits 38-1 to 38-5 may be actuated by any of the 10 available single digits, ie their T relays may be coupled to any of the outputs 38. For example, they be actuated by digits 1, 4, 5, 6, and 7. In that case, the group 34 output terminals for digits 5 and 6 are connected to the T relays of two of the transfer circuits, and the output terminals 60 for digits 1, 4 and 7 are connected to the T relays of the remaining three transfer circuits. The remaining output terminal 60 (that for digit "0") may be connected to the ringer of a station having a single digit code.

Thus, for the example given above, if the first digit dialled is a "7", this will actuate one of the transfer circuits 38-1 to 38-5 (say transfer circuit 38-5). The T relay and hence the TR5 relay in transfer circuit 38-5 operate, and operated contacts TR5- then connect the group 32 outputs to routing network 50-5 and disconnect the group 32 outputs from terminals 60, so that when the next digit is dialled, another transfer circuit connected to terminals 60 will not be actuated. If the first digit dialled is a "0", then a ground signal (which has no effect), and then ringing are applied to the group 32 output terminal for digit "0" and hence over leads 54, 56, 58 to the terminal 60 for digit "0" and hence to the ringer of the station having the code "0". The arrangement shown may be used for up to 10 transfer circuits, with partial decoding in each case being achieved at the inputs to the transfer circuits.

In the FIG. 4 circuit, the connections to inputs 26, 48 of the routing contact network 24 will be as shown in FIG. 4, so that when any one of the transfer relays is operated, the ringing lead is switched from input 26 to input 48.

It will be appreciated that the transfer circuit described may be used with stations employing tone dialling. In such event, a conventional tone adapter circuit will be used, having a filter and relays therein. The filter recognizes pairs of tones received from a calling station and operates a selected pair of relays in the tone adapter. The pairs of relays in the tone adapter may be connected to operate appropriate relays in the relay counter coil network 24, so that after a digit has been dialled by a tone station, the result will be the same as in the case of a rotary dial station, i.e. the Y relays in the relay counter corresponding to the digit dialled will be operated. When a tone station makes a call, then at the end of dialling, the operated pairs of relays in the tone adapter release, applying ground via means not shown to the right hand side (as drawn) of the relay R coil, thus operating relay R, and the operation then continues as described in the case of dial pulse signalling.

Although a particular form of relay counter has been shown, other forms of relay counters may also be used, so long as they have a plurality of relays and a routing contact network, the relays being connected to react to digit information to route an input of the routing contact network to an output associated with the digit received. The routing contact network will always be disjoint, meaning that it will never have a state in which its input is connected to more than one output at the same time and it will never have a state in which it connects two outputs together. In all cases, the routing contact network will, for the second digit of transfer calls, be reentered at a second input that has access only to a selected group of outputs of the routing contact network when a digit is received, but not to the remaining outputs.

This is most conveniently achieved, as shown in FIG. 3, by dividing the routing contact network into two contact portions, each having its own group of outputs (group 32 and group 34 in FIG. 3) and separating the two contact portions by a series connection of a normally open and a normally closed contact of a Y relay. In the FIG. 3 circuit, these contacts are Y2-6. Input 26 is connected between these contacts so that a signal at input 26 can reach either contact portion, but input 48 is connected between contacts Y5-5 and Y2-6 and thus can reach only one contact portion.

The selected group of outputs that can be reached by the second input to the routing contact network can be made as low as one in number, but then decoding from one onto 10 leads would be required, necessitating a full second relay counter. In other words, if the selected group (e.g. group 32 in FIG. 4) were constituted by only one output 28, no use would be made of routing network 24 for partial decoding. Therefore the selected group of outputs to which the second input has access should be at least two in number. Four has been found to be an optimum number, but more than four could be used if desired.

Figure 5:
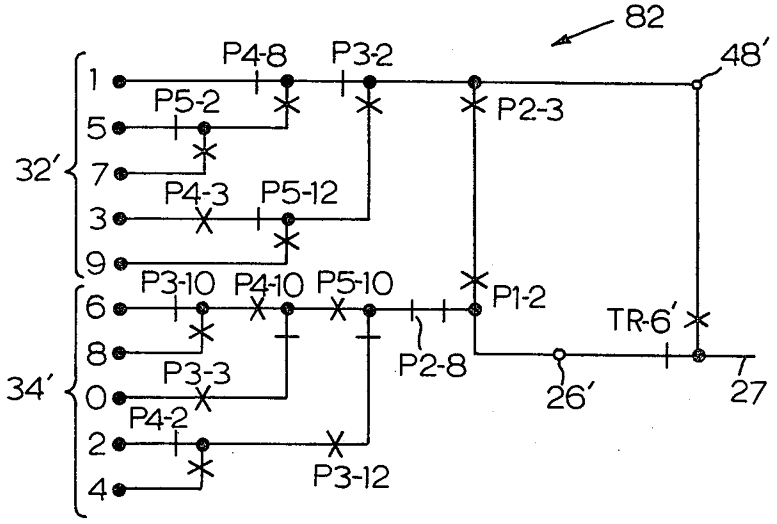
FIG. 5 shows an alternative relay routing contact network.

By way of example, the well known relay counter shown in Canadian Pat. No. 836,658 issued Mar. 10, 1970, inventor, Derek Leyburn, may be used. A suitable relay counter coil network is shown in FIG. 3 of that patent, and the routing network is shown at 12 in FIG. 5 of the patent. For convenience, the relay counter routing network of that patent is reproduced at 82 in FIG. 5 hereof. As will be seen, routing network 82 includes contacts of five P relays P1 to P5 which operate as shown in Table II at the end of this description during pulsing of relay A. Input 26' is connected between contacts P1-2 as shown, and is connected to ringing lead 27 through a normally closed contact of contacts TR-6'. The second input 48' is connected between contacts P3-2 and P2-3 and is connected to ringing lead 27 through a normally open contact of contacts TR-6'. It will be noted from Table II that in this arrangement, when input 48' is used, and digit "2" is dialled, input 48' is not connected to any output (since only relay P3 is operated). Digit "2" would therefore not be assigned as the second digit of any transfer code. In the routing network 82, the five output terminals for digits 1, 3, 5, 7 and 9 correspond to the group 32 output terminals and hence are numbered 32', and the five output terminals for digits 2, 4, 6, 8 and 0 correspond to the group 34 output terminals and are numbered 34'.

TABLE I

| Digit | Relays operated** | | | | |
|---|---|---|---|---|---|
| (*) | | Y2 | Y3 | | |
| 1 | | Y2 | | | |
| | Y1 | Y2 | | | |
| 2 | Y1 | | | | |
| | Y1 | | Y3 | Y4 | |
| 3 | | | Y3 | Y4 | |
| | | Y2 | Y3 | Y4 | |
| 4 | | Y2 | | Y4 | |
| | Y1 | Y2 | | Y4 | |
| 5 | Y1 | | | Y4 | Y5 |
| | Y1 | | Y3 | Y4 | Y5 |
| 6 | | | Y3 | Y4 | Y5 |
| | | Y2. | Y3 | Y4 | Y5 |
| 7 | | Y2 | | Y4 | Y5 |
| | Y1 | Y2 | | | Y5 |
| 8 | Y1 | | | | Y5 |
| | Y1 | | Y3 | | Y5 |
| 9 | | | Y3 | | Y5 |
| | | Y2 | Y3 | | Y5 |
| 0 | | Y2 | | | Y5 |

*Relay A released, relay B operated (i.e. during first dial pulse).
**Any Y relays not listed are not operated.

TABLE II

| Digit dialed | P relays operated | | | | | Output terminal connected to input 48' |
|---|---|---|---|---|---|---|
| 1 | 1 | 2 | | | | 1 |
| 2 | | | 3 | | | |
| 3 | 1 | 2 | 3 | 4 | | 3 |
| 4 | | | 3 | 4 | | 3 |
| 5 | 1 | 2 | | 4 | | 5 |
| 6 | | | | 4 | 5 | 7 |
| 7 | 1 | 2 | | 4 | 5 | 7 |
| 8 | | | 3. | 4 | 5 | 9 |
| 9 | 1 | 2 | 3 | | 5 | 9 |
| 0 | | | 3 | | 5 | 9 |

What I claim is

1. For a telephone system of the type including a ringing output, and means adapted to apply a ringing voltage to said ringing output following completion of receipt of a digit from a calling station; a line transfer system comprising:

a. a relay counter having 2. a plurality of counting relays, 2. means, including contacts of said counting relays, interconnecting said counting relays and responsive to receipt of a digit from said calling station to operate said counting relays in a plurality of predetermined operating combinations, one said predetermined operating combination for each digit received, 3. a disjoint routing contact network having first and second inputs and a plurality of first outputs, said first outputs being divided into first and second groups, said first group including at least two of said first outputs but not all of said first outputs, said second group comprising the remainder of said first outputs, 4. said routing contact network including means, including a plurality of routing contacts of said counting relays, responsive to operation of said relays in said operating combinations for connecting said first input to a different first output for each said operating combination, 5. said routing contact network including means, including some of said routing contacts, responsive to operation of said relays in said operating combinations for connecting said second input to outputs of said first group for at least some of said operating combinations and for disconnecting said second input from said outputs of said second group for all of said operating combinations, b. means for connecting said ringing output to said first input, c. transfer switch means connected to one of said first outputs and operative on receipt of a transfer signal at said one first output, d. said transfer switch means including means for disconnecting said ringing output from said first input and for connecting said ringing output instead to said second input upon operation of said transfer switch means, e. said transfer switch means further including a plurality of second outputs, and connecting and decoding means coupled to said first group of first outputs and responsive, when said transfer switch means is operated, to receipt of a digit from said calling station and to consequent connection of said second input to a selected output of said first group, to connect said selected output of said first group to a said second output corresponding to the digit received.

2. A line transfer circuit according to claim 1 wherein said connecting and decoding means includes a plurality of decoding relays, fewer in number than the number of said counting relays, and means connecting said decoding relays to selected counting relays for operation, when said transfer switch is operated, when said selected counting relays are operated.

3. A line transfer system according to claim 1 wherein said connecting and decoding means includes a pair of decoding relays, and means connecting said decoding relays to selected counting relays for operation, when said transfer switch is operated, when said selected counting relays are operated.

4. A line transfer system according to claim 1 wherein said first outputs are 10 in number, said first group consisting of four of said first outputs.

5. A line transfer system according to claim 1 wherein said transfer switch means includes a detector relay connected to said one first output and operative upon receipt of said transfer signal; a transfer relay; means for operating said transfer relay upon operation of said detector relay; said transfer relay including a plurality of contacts; means including a contact of said transfer relay for releasing said detector relay upon operation of said transfer relay; said connecting and decoding means including first and second decoding relays; means including a contact of said transfer relay for enabling said decoding relays when said transfer relay is operated; means connecting said first and second decoding relays respectively to first and second counting relays of said relay counter for operation respectively when said first and second counting relays operate provided that said transfer relay is operated; said means for disconnecting said ringing output from said first input and for connecting it to said second input comprising contacts of said transfer relay.

6. A line transfer system according to claim 2 wherein said transfer switch means includes transfer relay means having a plurality of contacts; means connected to said one first output for operating said transfer relay means upon receipt of said transfer signal from said one first output; means including a contact of said transfer relay means for enabling said decoding relays when said transfer relay means is operated; said connecting and decoding means including means coupling said second outputs to said first group of first outputs through contacts of said decoding relays and through normally open contacts of said transfer relay means, said means for disconnecting said ringing output from said first input and for connecting it to said second input comprising contacts of said transfer relay means.

7. A line transfer system according to claim 6 including a plurality of said transfer switch means, said means in each transfer switch means for operating said transfer relay means thereof being connected to a different one of said first outputs, said connecting and decoding means of each transfer switch means including means coupling said second outputs of such transfer switch means to said first group of first outputs through contacts of said decoding relays of such transfer switch means and through normally open contacts of said transfer relay means of such transfer switch means; a plurality of terminals, one corresponding to each first output of said first group, and means connecting each said terminal to its associated first output through a normally closed contact of each transfer relay means, so that whenever a said transfer relay means is operated, said terminals are disconnected from said first outputs, whereby said connection of said means in each transfer switch means for operating the transfer relay means thereof to said first outputs may be through said terminals, and whereby any unused ones of said terminals may be connected directly to a said station.

8. A line transfer system according to claim 7 wherein said first outputs are 10 in number, said first group consisting of four of said first outputs, said decoding relays in each transfer switch means being two in number, and said second outputs of each transfer switch means are 10 in number.

9. A line transfer system according to claim 2 wherein said routing contact network includes a normally open and a normally closed routing contact of one said counting relay, means connecting such routing contacts in series to form a series connection, and first and second routing contact portions connected together by said series connection, said first input being connected between said normally open routing contact and said normally closed routing contact, whereby when said one counting relay is operated, said first input is connected to one of said contact portions and when said one counting relay is released, said first input is connected to the other of said contact portions, said second input being connected to one of said contact portions and being separated from the other contact portion by said series connection.

10. A line transfer system according to claim 9 wherein said one contact portion includes means responsive to operation of said counting relays in said operating combinations for connecting said second input to an output of said first group for every operating combination of said counting relays.

11. A line transfer system according to claim 1 wherein said relay counter has five counting relays numbered from 1 to 5 inclusive and said means for operating said relays upon receipt of a digit from said calling station operates said counting relays in the following combinations according to the digit received:

COUNTING RELAYS

| DIGIT | 1 | 2 | 3 | 4 | 5 |
|---|---|---|---|---|---|
| 1 | off | on | off | off | off |
| 2 | on | off | off | off | off |
| 3 | off | off | on | on | off |
| 4 | off | on | off | on | off |
| 5 | on | off | off | on | on |
| 6 | off | off | on | on | on |
| 7 | off | on | off | on | on |
| 8 | on | off | off | off | on |
| 9 | off | off | on | off | on |
| 0 | off | on | off | off | on |

said routing contact network including normally operated and normally released contacts; one of said first outputs being connected to said first input through a normally closed contact of relay (4), a selected normally closed contact of relay (5), and a normally open contact of relay (2); a second of said first outputs being connected to said first input through normally closed contacts of relays (3), (5), (4) and (2); a third of said first outputs being connected to said first input through a normally closed contact of relay (5), a normally open contact of relay (4), and said normally closed contact of relay (2); a fourth of said first outputs being connected to said first input through a normally open contact of relay (4), said selected normally closed contact of relay (5), and said normally open contact of relay (2); a fifth of said first outputs being connected to said first input through a normally closed contact of relay (3), normally open contacts of relays (5) and (4), and said normally closed contact of relay (2); a sixth of said first outputs being connected to said first input through normally open contacts of relays (3), (5) and (4), and said normally closed contact of relay (2); a seventh of said first outputs being connected to said first input through normally open contacts of relays (4) and (5) and said normally open contact of relay (2); an eighth of said first outputs being connected to said first input through normally open contacts of relays (1) and (5), a normally closed contact of relay (4), and said normally closed contact of relay (2); a ninth of said first outputs being connected to said first input through a normally closed contact of relay (1), a normally open contact of relay (5), a normally closed contact of relay (4), and said normally closed contact of relay (2); a tenth of said first outputs being connected to said first input through a normally closed contact of relay (4), a normally open contact of relay (5), and said normally open contact of relay (2); said first group of first outputs being said first, fourth, seventh and tenth outputs, said second input being connected between said normally open contact of relay (2) and said selected normally closed contact of said relay (5).

* * * * *